United States Patent
Zogg et al.

(10) Patent No.: US 9,858,824 B1
(45) Date of Patent: Jan. 2, 2018

(54) FLIGHT PLAN OPTIMIZATION FOR MAINTAINING INTERNET CONNECTIVITY

(71) Applicants: Scott J. Zogg, Cedar Rapids, IA (US); Steven D. Acheson, Marion, IA (US); Kevin M. Kronfeld, Cedar Rapids, IA (US); Jaclyn A. Hoke, Marion, IA (US); Kevin J. Delaney, Annapolis, MD (US); David J. Weiler, Robins, IA (US)

(72) Inventors: Scott J. Zogg, Cedar Rapids, IA (US); Steven D. Acheson, Marion, IA (US); Kevin M. Kronfeld, Cedar Rapids, IA (US); Jaclyn A. Hoke, Marion, IA (US); Kevin J. Delaney, Annapolis, MD (US); David J. Weiler, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 60 days.

(21) Appl. No.: 14/799,368

(22) Filed: Jul. 14, 2015

(51) Int. Cl.
*G08G 5/00* (2006.01)
*H04W 84/06* (2009.01)

(52) U.S. Cl.
CPC .......... *G08G 5/0034* (2013.01); *G08G 5/0039* (2013.01); *H04W 84/06* (2013.01)

(58) Field of Classification Search
CPC .................................................. H04W 84/06
See application file for complete search history.

(56) References Cited

U.S. PATENT DOCUMENTS

| | | | | |
|---|---|---|---|---|
| 6,625,537 B2 * | 9/2003 | Dwyer | ........... | G01C 23/00 701/467 |
| 9,020,536 B1 * | 4/2015 | Crossno | ........... | G06Q 10/0833 455/456.1 |
| 2003/0125043 A1 * | 7/2003 | Silvester | ........... | H04W 4/02 455/456.1 |
| 2003/0139877 A1 * | 7/2003 | Dwyer | ........... | G08G 5/0034 701/467 |
| 2007/0253341 A1 * | 11/2007 | Atkinson | ........... | H04L 45/02 370/252 |
| 2008/0097688 A1 * | 4/2008 | Tashev | ........... | G01C 21/34 701/532 |
| 2009/0326810 A1 * | 12/2009 | Callaghan | ........... | G01C 21/26 701/532 |
| 2010/0017119 A1 * | 1/2010 | Diaz | ........... | G01C 21/32 701/533 |
| 2010/0066566 A1 * | 3/2010 | Reusser | ........... | G01C 23/00 340/971 |

(Continued)

*Primary Examiner* — Rami Khatib
*Assistant Examiner* — Jeffrey Boomer
(74) *Attorney, Agent, or Firm* — Donna P. Suchy; Daniel M. Barbieri

(57) ABSTRACT

A system for determining a flight plan based on internet connectivity includes at least one processor coupled with a non-transitory processor-readable medium storing processor-executable code for causing the at least one processor to receive internet connectivity data for a plurality of airspace regions, where the internet connectivity data is indicative of an internet connectivity characteristic; and determine a flight plan for an aircraft through at least one region of the plurality of airspace regions based on the internet connectivity characteristic.

18 Claims, 6 Drawing Sheets

(56) References Cited

U.S. PATENT DOCUMENTS

| | | | |
|---|---|---|---|
| 2010/0131121 A1* | 5/2010 | Gerlock | G08G 5/0013 701/2 |
| 2010/0153001 A1* | 6/2010 | Bauchot | G01C 21/00 701/533 |
| 2010/0312466 A1* | 12/2010 | Katzer | G01C 21/3492 701/533 |
| 2012/0143882 A1* | 6/2012 | Zheng | G06Q 10/08 707/751 |
| 2013/0151138 A1* | 6/2013 | Lu | G09B 29/106 701/410 |
| 2013/0321424 A1* | 12/2013 | Pylappan | G06T 11/00 345/440 |
| 2014/0078403 A1* | 3/2014 | Joslyn | H04N 5/50 348/731 |
| 2014/0254543 A1* | 9/2014 | Engelhard | H04W 64/006 370/329 |
| 2014/0379252 A1* | 12/2014 | Sorokin | G01C 21/3461 701/426 |
| 2015/0120087 A1* | 4/2015 | Duan | H04L 67/12 701/1 |
| 2015/0177017 A1* | 6/2015 | Jones | G01C 21/3682 701/428 |
| 2016/0119799 A1* | 4/2016 | Hutchins | H04W 24/04 455/67.7 |
| 2016/0282872 A1* | 9/2016 | Ahmed | B64C 39/024 |
| 2016/0300492 A1* | 10/2016 | Pasko | G08G 5/0091 |
| 2016/0300493 A1* | 10/2016 | Ubhi | H04B 7/18504 |
| 2016/0328980 A1* | 11/2016 | Sharma | G08G 5/0013 |
| 2016/0371985 A1* | 12/2016 | Kotecha | G08G 5/0034 |
| 2017/0045884 A1* | 2/2017 | Kablaoui | G05D 1/0022 |

* cited by examiner

FLIGHT PLAN OPTIMIZATION FOR MAINTAINING INTERNET CONNECTIVITY

BACKGROUND

The inventive concepts disclosed herein relate generally to the field of airborne navigation systems, and more particularly to airborne navigation systems for optimizing flight plans based on internet connectivity.

Aircraft typically follow an organized flight plan between an origin and a destination. Various factors inform the creation and adjustment of a flight plan for an aircraft, including threat avoidance, fuel consumption, aircraft performance parameters, time and distance to a destination, a load carried by the aircraft, political boundaries, turbulence, and other weather conditions. Aircraft may typically include communication systems for providing communication services to the passengers and crew, such as internet connectivity. Some travelers require or desire continuous internet connectivity throughout a flight or internet connectivity at a specific time during a flight, such as for attending meetings or engaging in other business activities. However, internet connectivity can be difficult to maintain on an aircraft due to the scarcity of stable and/or continuous connections to remote data sources that provide internet connectivity.

A need exists for a navigation system linked to a communications system of an aircraft to provide flight planning capabilities for optimizing internet connectivity during a flight. A further need exists for adjusting flight plans enroute for optimizing internet connectivity based on a desired connectivity parameter, such as a minimum data transfer rate or maintaining an internet connection during a specified time period.

SUMMARY

In one aspect, embodiments of the inventive concepts disclosed herein are directed to a system for determining a flight plan. The system includes at least one processor coupled with a non-transitory processor-readable medium storing processor-executable code. The processor-executable code causes the at least one processor to receive internet connectivity data for a plurality of airspace regions. The internet connectivity data is indicative of an internet connectivity characteristic. The processor-executable code further causes the at least one processor to determine a flight plan for an aircraft through at least one region of the plurality of airspace regions based on the internet connectivity characteristic.

In a further aspect, embodiments of the inventive concepts disclosed herein are directed to a method of determining a flight plan. The method includes receiving a data signal indicative of an internet connectivity characteristic for at least one of a plurality of airspace regions; and determining the flight plan based on the internet connectivity characteristic.

In another aspect, embodiments of the inventive concepts disclosed herein are directed to a system for determining a flight plan. The system includes at least one processor coupled with a non-transitory processor-readable medium storing processor-executable code. The processor-executable code causes the at least one processor to receive flight plan data indicative of a first flight plan for an aircraft, and receive internet connectivity data for a plurality of airspace regions. The internet connectivity data is indicative of an internet connectivity characteristic for each airspace region of the plurality of airspace regions. The processor-executable code further causes the at least one processor to determine a second flight plan and a third flight plan for an aircraft based on the internet connectivity data, and provide display data indicative of the second flight plan, the third flight plan, and the internet connectivity data to a display system.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Before turning to the figures, which illustrate exemplary embodiments of the inventive concepts disclosed herein in detail, it should be understood that the inventive concepts are not limited to the details or methodology set forth in the description or illustrated in the figures. It should also be understood that the terminology is for purpose of description only and should not be regarded as limiting. For example, the inventive concepts disclosed herein are described with reference to an aircraft, however, it will be appreciated that the inventive concepts are not limited to being practice on or with reference to an aircraft. For example, components of the flight plan optimization system may be ground-based such that alternate flight plans may be developed on the ground and uplinked to display systems (e.g., built-in display, an electronic flight bag, tablet computer) on board an aircraft or otherwise communicated to an aircraft pilot for analysis. As discussed below, systems and methods contemplated herein are configured to optimize a flight plan of an aircraft based on internet connectivity.

Figure 1:
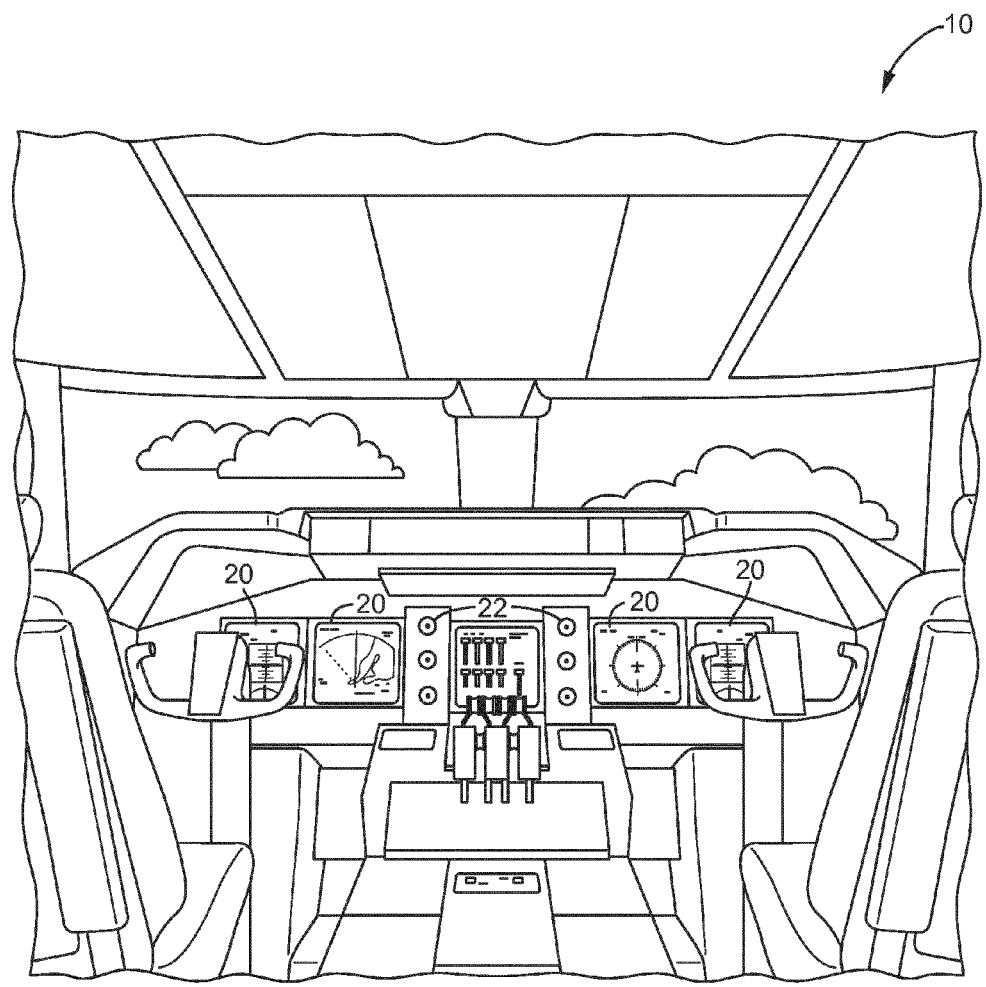
FIG. 1 is a schematic illustration of an aircraft control center, according to an exemplary embodiment.

Referring to FIG. 1, an exemplary aircraft control center or cockpit 10 for an aircraft is shown. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation ("NAV") displays, primary flight displays, electronic flight bag displays, tablets such as iPad® computers manufactured by Apple, Inc. or tablet computers, synthetic vision system displays, head up displays ("HUDs") with or without a projector, wearable displays, watches, Google Glass®. The flight displays 20 may be used to provide information to the flight crew, thereby increasing the flight crew's visual range and enhancing their decision-making abilities. The flight displays 20 may be configured to function as, for example, a primary flight display ("PFD") used to display altitude, airspeed, vertical speed, and navigation and traffic collision avoidance system ("TCAS") advisories. The flight displays 20 may also be configured to function as, for example, a multi-function display used to display navigation maps, weather radar, electronic charts, TCAS traffic, aircraft maintenance data and electronic checklists, manuals, and procedures. The flight displays 20 may also be configured to function as, for example, an engine indicating and crew-alerting system ("EICAS") display used to display critical engine and system status data. Other types and functions of the flight displays 20 are contemplated and will be apparent to those skilled in the art. According to various exemplary embodiments of the inventive concepts disclosed herein, at least one of the flight displays 20 may be configured to provide a rendered display from the systems and methods of the present disclosure.

In some embodiments, the flight displays 20 may provide an output from an aircraft-based system, a ground-based system, a satellite-based system, or from a system of another aircraft. For example, in one embodiment, the flight displays 20 provide an output from a ground-based weather radar system. In some embodiments, the flight displays 20 provide an output from an aircraft-based weather radar system, LIDAR system, infrared system or other system on the aircraft. For example, the flight displays 20 may include an avionics display, a joint display, an air traffic display, a weather radar map, and a terrain display. The flight displays 20 may include an electronic display or a synthetic vision system ("SVS"). For example, the flight displays 20 may include a display configured to display a two-dimensional ("2-D") image, a three-dimensional ("3-D") perspective image of air traffic data, terrain, and/or weather information, or a four-dimensional ("4-D") display of weather information or forecast information. Other views of air traffic information, terrain, and/or weather information may also be provided (e.g., plan view, horizontal view, and vertical view). The views shown on the flight displays 20 may include monochrome or color graphical representations of the displayed information. Graphical representations of the displayed information may include an indication of altitude of other aircraft, weather conditions, or terrain, or the altitude and/or location of such information relative to the aircraft.

The UI elements 22 may include, for example, dials, switches, buttons, touch screens, keyboards, a mouse, joysticks, cursor control devices ("CCDs") or other multi-function key pads certified for use with avionics systems, and so on. The UI elements 22 may be configured to, for example, allow an aircraft crew member to interact with various avionics applications and perform functions such as data entry, manipulation of navigational maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew member to adjust the brightness, contrast, and information displayed on the flight displays 20. The UI elements 22 may additionally be used to acknowledge or dismiss an indicator provided by the flight displays 20. Further, the UI elements 22 may be used to correct errors on the flight displays 20. Other UI elements 22, such as indicator lights, displays, display elements, and audio alerting devices, may be configured to warn of potentially threatening conditions such as severe weather, terrain, obstacles.

Figure 2:
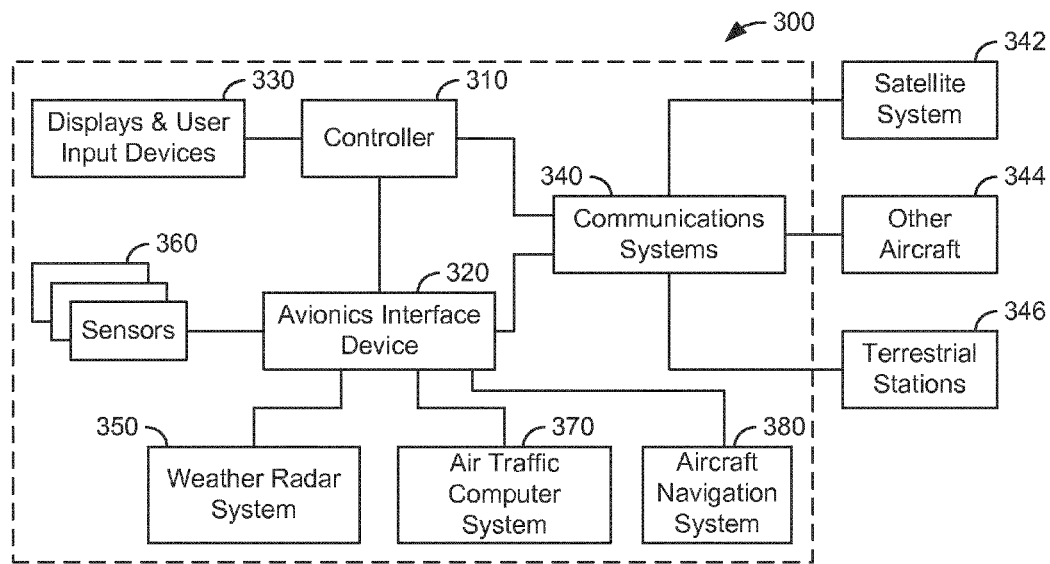
FIG. 2 is a block diagram of a flight plan optimization system including a controller, according to an exemplary embodiment.

Referring now to FIG. 2, a block diagram of a flight plan optimization system 300 is shown, according to an exemplary embodiment of the inventive concepts disclosed herein. The flight plan optimization system 300 includes a controller 310 including a communications interface, an avionics interface device 320, displays and user input devices 330, a communications systems 340, a weather radar system 350, sensors 360, an air traffic computer system 370, and an aircraft navigation system 380. The displays and user input devices 330 may be installed or located in an aircraft control center 10. For example, the displays and user input devices 330 may include a single device for displaying information and receiving an input (e.g., a touchpad) or may include separate devices for displaying information and receiving an input (e.g., an LCD screen and a keyboard), and may be or include electronic displays and input devices of any nature, such as the flight displays 20 and the UI elements 22.

The avionics interface device 320 may be a network interface configured to send data to, receive data from, or otherwise facilitate electronic data communications with aircraft-based systems, satellite-based systems, or ground-based systems. The avionics interface device 320 may interface with or be a flight management system, aircraft control system, aircraft monitoring system, or the like. In one example, the avionics interface device 320 may facilitate communications with the controller 310, the sensors 360, the weather radar system 350, the air traffic computer system 370, and the communications systems 340. The avionics interface device 320 may include wired or wireless interfaces (e.g., jacks, antennas, transmitters, receivers, transceivers, wire terminals) for conducting data communications with various systems, devices, or networks. For example, the avionics interface device 320 may include an Ethernet card and port for sending and receiving data via an Ethernet-based communications network and/or a WiFi transceiver for communicating via a wireless communications network. In some embodiments, the avionics interface device 320 may be configured to communicate via local area networks or wide area networks and may use a variety of communications protocols. In some embodiments, the avionics interface device 320 may include components of ground-based systems or components of aircraft-based systems. For example, the avionics interface device 320 may include the controller 310, the sensors 360, and the communications systems 340.

In some embodiments, the communications systems 340 facilitates communications between the avionics interface device 320 and a satellite system 342, other aircraft 344, a terrestrial stations 346, or other air, space, or ground-based systems. For example, the communications systems 340 may send data to and receive data from external ground-based weather supplier systems and ground-based air traffic control systems. The communications systems 340 may be configured to communicate with systems external to the aircraft using any number of systems or methods. In some embodiments, the communications systems 340 sends and receives data over a mobile network. The communications systems 340 may utilize various types of channels to communicate, including virtual channels, radio channels, satellite channels, and so on. The channels may be bi-directional or uni-directional and may be satellite link channels, VHF channels, INMARSAT channels, and so on. Any type of wireless communications may be utilized. Various types of communication protocols, including network and ad hoc network protocols may be used to perform communication operations and establish channels to facilitate communications. In some embodiments, aircraft-based systems may communicate with ground-based systems through short-range wireless communication systems 340 or wired interfaces (e.g., when the aircraft is parked at a terminal or otherwise grounded).

In some embodiments, the communications systems 340 may be configured to transmit, upload, or otherwise output data to an external system, such as the terrestrial stations 346. In some embodiments, the communications systems 340 continuously maintain a data transfer connection with an external system. In some embodiments, the communications systems 340 initiates a data transfer connection with an external system only when in range, or only during or after a certain event, such as a user instructing the communications systems 340 to initiate a data transfer, the aircraft landing at an airport, the aircraft coming to a stop, the aircraft docking at an airport terminal, or the aircraft pulling into an aircraft hangar.

The weather radar system 350 may be a system for detecting weather patterns. Detected weather patterns may be communicated to the displays and user input devices 330 (e.g., via the avionics interface device 320, the communications interface 314, and/or the display module 394) for display to the flight crew. In addition, data from the weather radar system 350, or the terrestrial stations 346, may be received by the controller 310 and then displayed on the displays and user input devices 330 (e.g., via the communications interface 314, the avionics interface device 320, and/or the display module 394). In some embodiments, the controller generates display data based on received environmental data, which may be indicative of a current environmental condition near the aircraft 30. For example, upon passing through a waypoint location, the weather radar system 350 may acquire temperature and/or wind speed readings, the controller may receive the temperature and/or wind speed readings from the weather radar system, and then the controller may generate weather radar data (e.g., via the weather radar module 392 and/or the display module 394) indicative of the current temperate and/or wind speed to display to the aircraft crew. Detected weather patterns may instead or may also be provided to electronics, such as the avionics interface device 320 and/or the controller 310, for further analysis or transmission to the terrestrial stations 346 or to the other aircraft 344 via the communications systems 340.

In some embodiments, the sensors 360 may include, one or more fuel sensors, airspeed sensors, location tracking sensors (e.g., GPS), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, or any other aircraft sensors or sensing systems that may be used to monitor the performance of an aircraft or weather local to or remote from the aircraft. The sensors 360 may be located in various positions on an aircraft, and a single sensor may be configured to acquire more than one types of sensor data. Data from the sensors 360 may be output to the controller 310 for further processing and display, or for transmission to a terrestrial station (e.g., a ground-based weather radar system, air traffic control services system, or other terrestrial station) or to other aircraft via the communications systems 340. Data collected from ground-based systems may also be processed by the controller 310 to process, analyze, and configure the collected data for display.

The air traffic computer system 370 may be configured to communicate with the avionics interface device 320. In some embodiments, the air traffic computer system 370 may be a navigation system. In some embodiments, the air traffic computer system 370 may communicate with external systems, such as terrestrial stations 346, via the communications systems 340 through, for example, the ACARS network. In some embodiments, the communications systems 340 may enable two-way communication between the avionics interface device 320 and all services available on the ACARS network, including PreDeparture Clearance ("PDC"), Digital Airport Terminal Information Services ("D-ATIS"), weather products and a host of messaging destinations including email, SMS, group messaging, fax and aviation ground networking addresses (e.g., Aeronautical Fixed Telecommunications Network "AFTN" and ARINC Data Network Service "ADNS"), among others. In some embodiments, the avionics interface device 320 may receive inputs regarding other aircraft and their locations (e.g., via the air traffic computer system 370 and/or the communications systems 340), and the controller 310 may be configured to determine the proximity of the other aircraft to the aircraft having the flight plan optimization system 300. For example, the aircraft may receive inputs regarding other aircraft and their locations from a Traffic Collision Avoidance System or an Automatic Dependent Surveillance-Broadcast service, which may provide a number of aircraft sharing a given satellite spot beam and/or the contention level for a given point of space and time.

Figure 5:
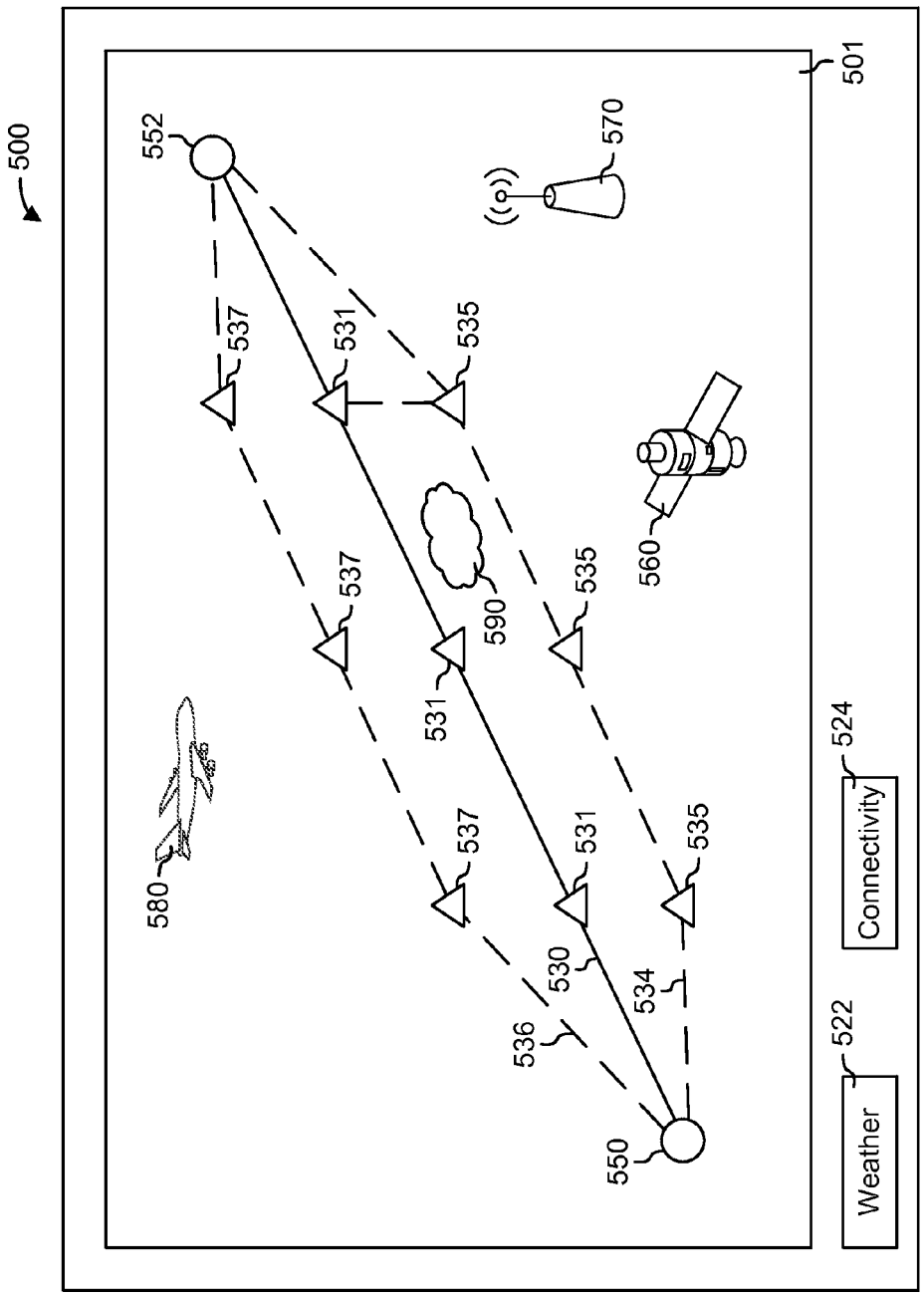
FIG. 5 is a schematic illustration of a display of a flight plan, according to an exemplary embodiment.

The system 300 includes an aircraft navigation system 380. The aircraft navigation system 380 may be configured to perform navigation functions such as determining a flight plan, causing an aircraft to follow the flight plan using the aircraft's autopilot mode, adjusting flight plans based on various factors, and/or creating and modifying the flight plan based on instructions received from the air traffic computer system 370. The aircraft navigation system may determine a flight plan between an origin (e.g., a position/location from which the aircraft took off; a current position/location) and a destination (e.g., a position/location where the aircraft is intended to be landed). The aircraft navigation system 380 may include a display for displaying the flight plan (e.g., flight plan 501 illustrated on a display 500 as shown in FIG. 5). The aircraft navigation system 380 may send/receive data from sources such as the satellite system 342, other aircraft 344, and/or terrestrial stations 346.

In some embodiments, displays and user input devices 330 are used to display the flight plan, and may allow a user to highlight certain features of the flight plan, zoom in on certain features of the flight plan, and/or modify the flight plan. For example, in some embodiments, a user may focus on the flight plan or a portion thereof, take note of optimal flight plans and alternative flight plans provided by the aircraft navigation system 380, and use the user input device 330 to select an alternative flight plan. In some embodiments, a user may be able to input a critical time period during the flight when internet connectivity is a critical priority. For example, a passenger expecting to attend a meeting/web-conference/teleconference during a particular time period when the aircraft is in flight may provide an input to the flight plan optimization system 300 (e.g., using the UI elements 22) specifying the time period when internet connectivity is a critical priority, and the flight plan optimization system 300 may ensure that the passenger has internet connectivity during the specified time period by adjusting the aircraft's planned route. In some embodiments, a user (e.g., an operator of an aircraft) is able to select a flight plan to be followed.

Figure 3:
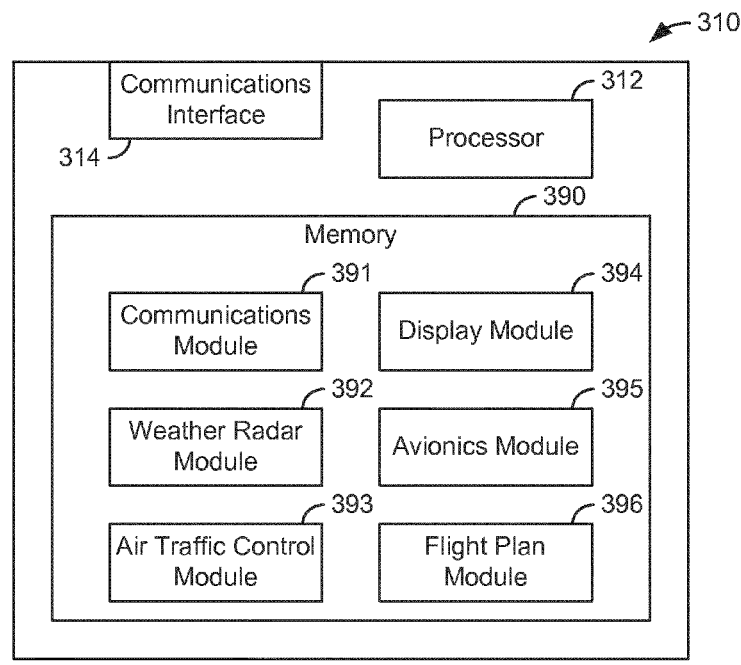
FIG. 3 is a block diagram of the controller of the flight plan optimization system, according to an exemplary embodiment.

Referring now to FIG. 3, a detailed block diagram of an exemplary embodiment of the controller 310 is shown. The controller 310 includes a processor 312, a communications interface 314, and a memory 390. The communications interface 314 is configured to facilitate communications with other components of the flight plan optimization system 300. The processor 312 may be coupled with the memory 390, which may comprise a non-transitory processor-readable medium storing processor-executable code and/or data. The processor 312 may be implemented as a specific purpose processor, an application specific integrated circuit ("ASIC"), one or more field programmable gate arrays ("FPGAs"), a group of processing components, or other suitable electronic processing components. Any controllers and modules described herein may be implemented as a hardware circuit comprising custom VLSI circuits or gate arrays, off-the-shelf semiconductors such as logic chips, transistors, or other discrete components, and may be implemented in programmable hardware devices such as field programmable gate arrays, programmable array logic, programmable logic devices or the like. The memory 390 is one or more devices (e.g., RAM, ROM, flash memory, hard disk storage) for storing data and/or computer code for completing and/or facilitating the various user or client processes, layers, and modules described in the present disclosure. The memory 390 may be or include volatile memory or non-volatile memory and may include database components, object code components, script components, or any other type of information structure for supporting the various activities and information structures of the present disclosure. The memory 390 is communicably connected to the processor 312 and includes computer code or instruction modules for executing one or more processes described herein.

The communications interface 314 may facilitate communications with other components of the flight plan optimization system 300. For example, the communications interface 314 may facilitate communications with the communications systems 340, avionics interface device 320, and displays and user input devices 330. The communications interface 314 may be configured to receive sensor input from the sensors 360, and to communicate information to and from the displays and user input devices 330 via a wired or wireless connection. The communications interface 314 may include any type of wired or wireless technology for facilitating communications, including electronic and optical communication protocols.

The memory 390 is shown to include various modules for determining properties related to optimizing flight plans for internet connectivity, including a communications module 391, a weather radar module 392, an air traffic control module 393, a display module 394, an avionics module 395, and a flight plan module 396. The communications module 391 may be configured to control the communications systems 340, for example, to send and/or receive data via the satellite system 342, the other aircraft 344, or the terrestrial stations 346 based on a user input received from the displays and user input devices 330. The weather radar module 392 may be configured to control the weather radar system 350 via a user input received from the displays and user input devices 330, for example, to cast one or more radar beams from an aircraft-mounted antenna, to receive returns, and to interpret the returns for display to the aircraft crew. In some embodiments, the weather radar system 350 may be controlled via an external weather radar system, such as one located on the terrestrial station 346. The air traffic control module 393 may be configured to control the air traffic computer system 370, for example, to send and/or receive data to or from a ground-based air traffic control station via the communications systems 340. The display module 394 may be configured to generate display data and provide the display data to a display system.

In some embodiments, the avionics module 395 is configured to communicate with other components of the flight plan optimization system 300 via the avionics interface device 320 and/or the communications systems 340 to acquire, gather, generate, analyze, process, or otherwise configure data for being displayed on the displays and user input devices 330. In some embodiments, the data is displayed in real time. The avionics module 395 may be configured to receive, process, and/or analyze data acquired by the sensors 360 and/or the avionics interface device 320. For example, data may be acquired by at least one of ACARS, a mobile network, via ARINC 429 and/or ARINC 717 standards, an internal GPS system, an external GPS system, a propriety data acquisition unit, such as a proprietary flight management system developed by Rockwell Collins or other supplier of avionic equipment. For example, the acquired data may include data indicative of at least one of a planned route of flight, an actual route of flight, an estimated time over points (e.g., predetermined waypoint locations), an actual time over points, a fuel burn amount, a fuel burn rate, information received via ACARS (e.g., ON, OFF, OUT, IN ("OOOI") events, fuel on board information), information received via ARINC standards, such as the ARINC 429 and/or ARINC 717 standards (e.g., information indicative of the aircraft's position, altitude, speed, direction, fuel remaining, fuel flow, wind and/or temperature data, current aircraft weight), aircraft position, altitude, speed, direction, heading, and so on.

The controller 310 includes a flight plan module 396. The flight plan module 396 is configured to perform functions including but not limited to creating a flight plan, storing the flight plan, modifying the flight plan, and optimizing the flight plan based on various flight plan optimization factors, such as an internet connectivity characteristic. The flight plan module 396 may determine and optimize the flight plan based on static factors, such as operating parameters of the aircraft and aircraft performance (e.g., maximum speed, type of fuel used, parameters of the engine(s) of the aircraft, total fuel capacity, and/or total load capacity). The flight plan module 396 may analyze multiple flight plans, compare the multiple flight plans (e.g., compare the flight plans to determine which flight plan is optimal), and present the multiple flight plans and/or the optimal flight plan to a user using, for example, the display module 394.

The flight plan optimization factors may include dynamic factors such as an internet connectivity characteristic; a flight time (e.g., a flight time elapsed, and/or a flight time remaining); a fuel consumption (e.g., an amount of fuel consumed, an amount of fuel remaining, an instantaneous fuel consumption rate, and/or an average fuel consumption rate); and a ride quality (e.g., a relative comfort on the aircraft, a current amount of turbulence experienced by the aircraft, an expected amount of turbulence to be experienced by the aircraft, and/or an average amount of turbulence experienced by the aircraft). For example, a new flight plan may provide a path to the destination that is longer (e.g., in distance and/or time) than an original path, and in some cases, the new path provides enhanced internet connectivity over at least a portion of the new flight path (e.g., the new flight plan provides certain upload and download data transfer rates, internet connectivity during a certain time period time period). In some embodiments, the new flight plan is selected and/or determined to be optimal if there is sufficient fuel to follow the new flight plan and safely land the aircraft at the original or updated destination. In some embodiments, the new flight plan is selected and/or determined to be optimal if there is sufficient fuel to follow the new flight plan and land the aircraft with sufficient reserve fuel in accordance with regulations, laws, or other fuel reserve or fuel on board requirements.

Figure 4A:
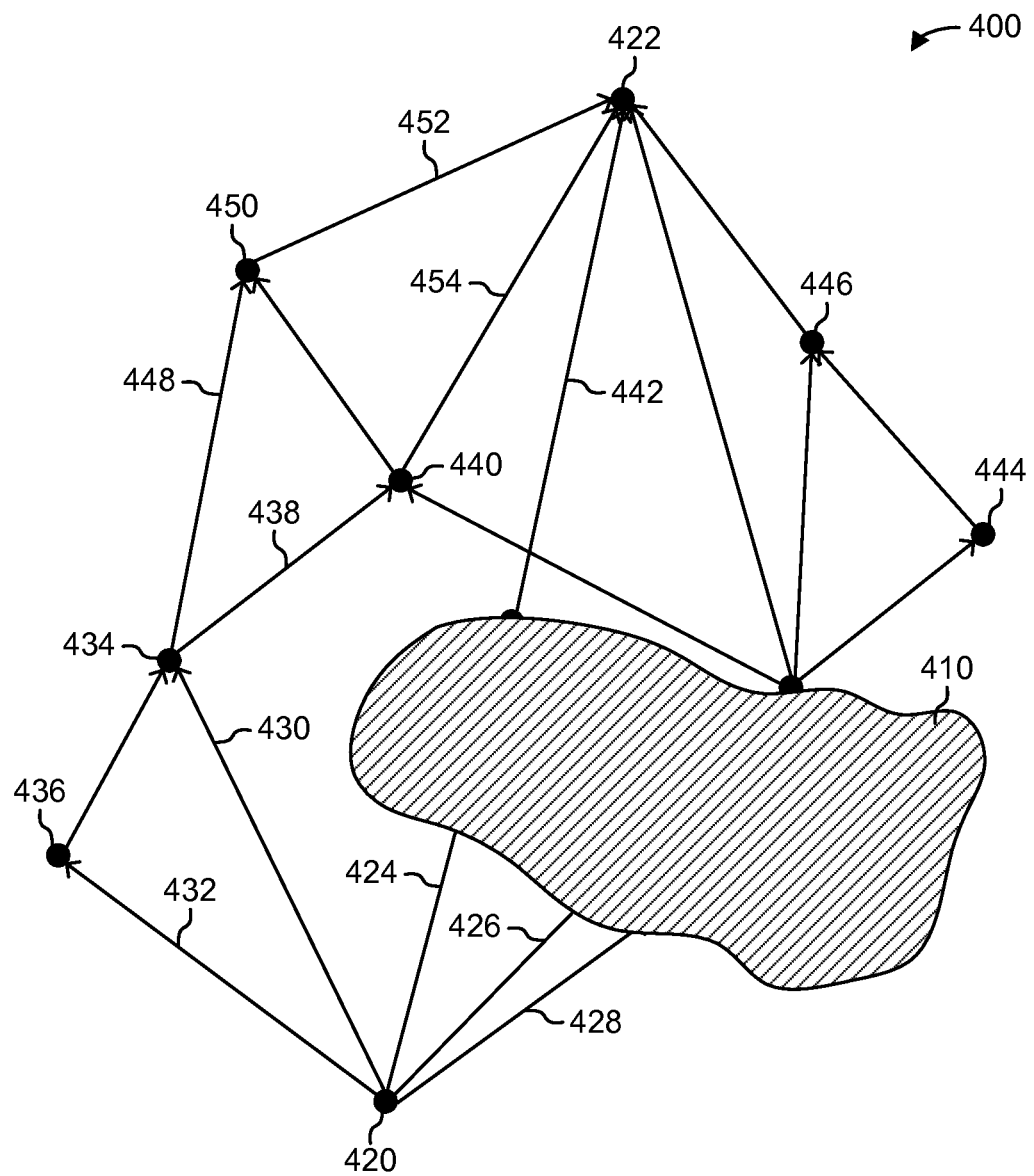
FIG. 4A is a schematic diagram of a flight plan map in which a convective event is present, according to an exemplary embodiment.
Figure 4B:
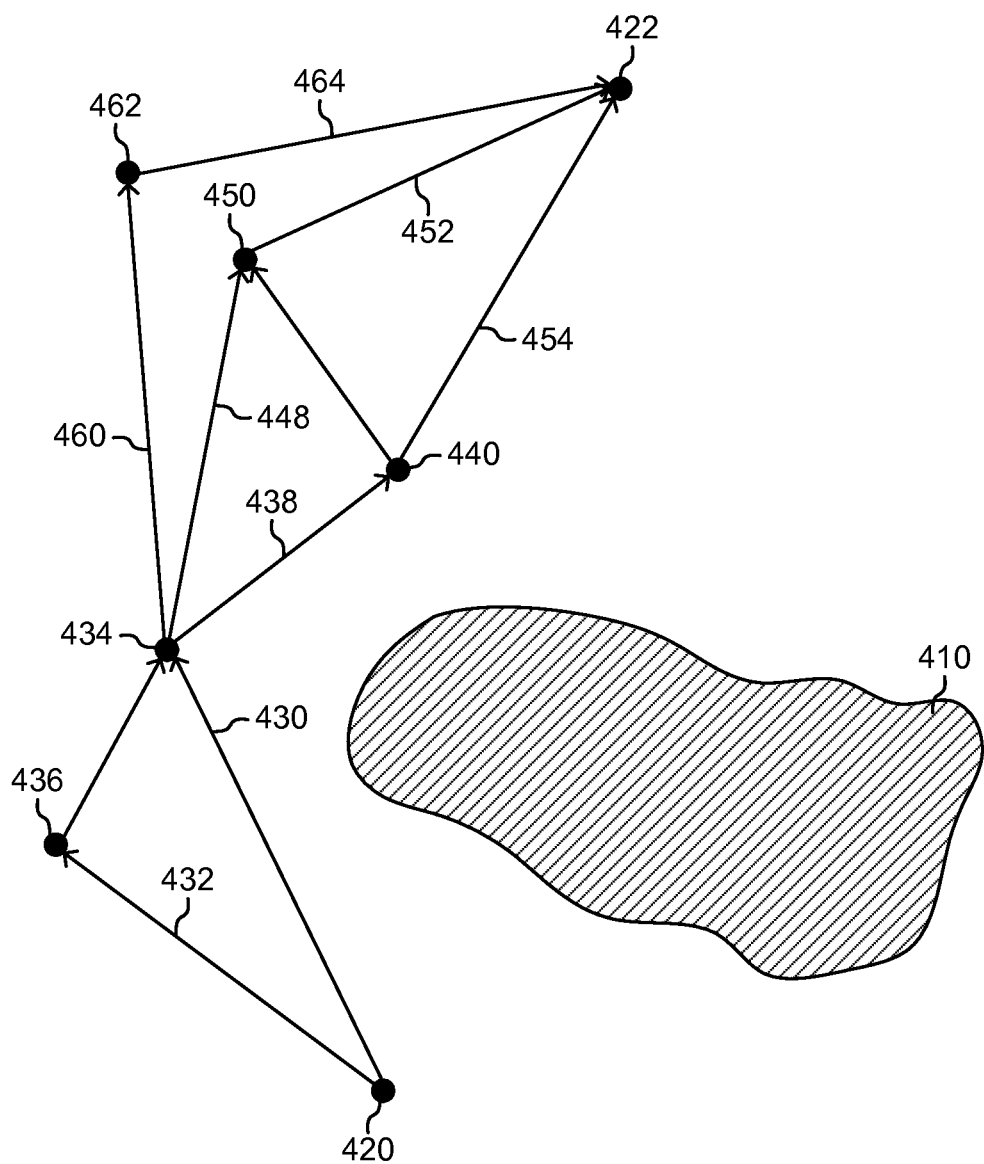
FIG. 4B is a schematic diagram of the flight plan map of FIG. 4A in which the flight plan map has been dynamically adjusted, according to an exemplary embodiment.

The flight plan optimization factors may include external factors that may influence the dynamic factors, such as additional aircraft that share bandwidth in a particular airspace region; other aircraft that within a certain proximity to the aircraft using the flight plan optimization system 300 (e.g., based on input from the air traffic computer system 370); temporary outages of internet signal sources (e.g., tower outages, and/or satellite outages); events that interfere with the data signal (e.g., events such as a convective event 410 illustrated in FIGS. 4A-4B). For example, a selected and/or optimal flight plan may include altering a route to the destination because an original route would require sharing too much internet bandwidth with other aircraft, such that data transfer rates would fall below a minimum threshold (e.g., a passenger on the aircraft may be expecting to attend a videoconference using an application or method requiring certain data transfer rates). As another example, aircraft crew and/or passengers may be alerted of an internet service outage from a ground-based tower on the original route. In some embodiments, the flight plan optimization system 300 may determine a new optimal flight plan based on receiving an internet service outage alert. The new optimal flight plan may require the aircraft to travel in range of a different ground-based tower or other internet source in order to maintain internet connectivity during the flight.

In some embodiments, the flight plan optimization system 300 determines a new flight plan based on analyzing and optimizing various factors before or after takeoff or at a certain point during the flight. The flight plan may be dynamically updated during the course of the flight as various flight plan optimization factors are modified. The flight plan may be dynamically updated by querying the status of various flight plan optimization factors at predetermined or regular intervals, then optimizing or re-optimizing the flight plan based on the various flight plan optimization factors. The flight plan may be dynamically updated by setting "normal" ranges (e.g., tolerated ranges) for various flight plan optimization factors, monitoring the flight plan optimization factors, and adjusting/re-optimizing the flight plan if one of the flight plan optimization factors departs from the normal range.

In some embodiments, components of the flight plan optimization system 300 may be ground-based. In some embodiments, ground-based components of the flight plan optimization system 300 may develop alternate flight plans based on aircraft performance parameters and internet connectivity characteristics. In some embodiments, the ground-based systems acquire aircraft performance parameters or a subset of the aircraft performance parameters from the aircraft via the communications systems 340 to determine alternate flight plans or to verify an alternate flight plan determined onboard the aircraft. In some embodiments, the ground-based station may use alternate data sources to determine an alternate flight plan or to very an alternate flight plan determined onboard the aircraft. For example, computations performed by ground-based stations may be based on information received from primary radar from the Federal Aviation Administration, Automatic Dependent Surveillance-Broadcast mesh network (e.g., flightradar24.com), and/or real-time flight tracking services (e.g. Rockwell Collins MultiLink). The ground-based stations may provide alternate flight plans to aircraft for display and analysis. In some embodiments, the alternate flight plans are uplinked to the aircraft via datalink using the communications systems 340 and displayed onboard the aircraft (e.g., using integrated displays, an electronic flight bag, tablet computer).

In some embodiments, flight plan optimization factors used by the flight plan module 396 may include minimum/maximum requirements or thresholds. The minimum/maximum requirements or thresholds may be particular to times of day and/or airspace regions. For example, the aircraft may have a required arrival time which has the highest priority relative to other factors such as fuel consumption and internet connectivity. The aircraft may be required to maintain a minimum fuel level, such that fuel consumption over the course of the flight cannot be so great that the fuel level becomes less than the minimum fuel level.

The internet connectivity characteristic may include various qualities and/or characteristics associated with a data connection providing internet service to the aircraft. The internet connectivity characteristic may be associated with a data connection between the aircraft and a remote data source (e.g., satellite system 342, other aircraft 344, and/or terrestrial stations 346). The internet connectivity characteristic may be associated with a data connection between the remote data source and a second source that transmits data to the remote data sources (e.g., between a remote data source and an internet service provider).

The internet connectivity characteristic may include a binary representation of whether an internet connection is available. The internet connectivity characteristic may also include a discrete representation of the internet data connection, such as a signal strength, a data transfer rate, an upload speed, a jitter characteristic, and/or a download speed. For example, the internet connectivity characteristic may include an average data transfer rate, a minimum data transfer rate, a maximum data transfer rate, or any combination thereof. In some embodiments, a passenger provides user input indicating a desired minimum data transfer rate, such as during a certain time period during the flight, and the flight plan optimization system 300 adjusts the flight plan to ensure that the minimum data transfer rate is achieved during the flight.

The internet connectivity characteristic may depend on the intended use of the internet connection. For example, the internet connectivity characteristic may represent whether the internet connection is sufficient for basic internet browsing and email communications, audio, video, voice over internet protocol (VoIP), or any other type of use. For example, in some embodiments, a sufficient connection data rate for VoIP is approximately 10 kbps, and a sufficient connection data rate for video is 1 Mbps. In other embodiments, sufficient connection data rates for VoIP, video, and other communication types may be higher or lower. In different embodiments, various bitrates for data connection rates will be considered sufficient based at least on a type of communication or application.

In some embodiments, the internet connectivity characteristic is indicative of whether the connection to a remote data source is subscription-based or otherwise restricted. For example, the internet connectivity characteristic may include whether the aircraft or a user aboard the aircraft is able to access a particular remote data source and an internet connection thereof based on whether the particular user or aircraft has a subscription to the particular data source. For example, a flight plan may include following a first route and not a second route because a passenger has a subscription to an internet service available on the first route, but the passenger does not have a subscription to an internet service available on the second route. The internet connectivity characteristic may include a price associated with connection to the remote data source.

The internet connectivity characteristic may be based on a measured internet connectivity, such as internet connectivity as measured by the aircraft or another aircraft passing through the airspace region of interest. The internet connectivity characteristic may also include a historical representation of internet connectivity in a particular airspace region, based on previously measured internet connectivities. For example, the internet connectivity for a particular region for a certain day, time, and weather condition may be estimated based on the internet connectivity experienced by the aircraft or other aircraft traveling through the particular region during the same time and under similar weather conditions on a previous day or earlier during the same day. The internet connectivity characteristic may be a non-probabilistic or probabilistic representation of internet connectivity. For example, the internet connectivity characteristic may be expressed as an expected average data transfer rate, with an associated confidence interval. The internet connectivity characteristic may be expressed as a probability (e.g., a percentage) that the internet connectivity in an airspace region will meet certain criteria, such as a minimum required data transfer rate.

In some embodiments, a normal or tolerated range for an internet connectivity characteristic (e.g., an average data transfer rate) may be provided. In some embodiments, the normal or tolerated range for the internet connectivity characteristic varies in magnitude depending on the associated data source (e.g., data sources such as satellite system 342, other aircraft 344, and terrestrial stations 346). For example, a ground-based data source may have a greater margin for maintaining a data connection with an aircraft than a satellite-based data source, and the ground-based data source may have a greater tolerated range for the internet connectivity characteristic than the satellite-based data source.

The flight module 396 may be configured to store historical data regarding flight plan optimization factors, such as previous flight times over a particular route, previous internet connectivity characteristics associated with a particular route or portions of a route, etc.

Referring to FIGS. 4A-4B, schematic diagrams of a flight plan map 400 in which a convective event is present are shown according to an exemplary embodiment of the inventive concepts disclosed herein. The flight plan map 400 depicts various paths from a current position represented by node 420 to a destination represented by node 422. Nodes described herein (e.g., nodes 420, 422) may represent waypoints (e.g., waypoint 552 shown in FIG. 5), geographical landmarks such as locations associated with ground-based communications sources, airspace locations such as locations associated with satellite-based communications sources, or any other location. While FIGS. 4A-4B provide a two-dimensional illustration of the flight plan map 400, it will be appreciated that the systems and methods disclosed herein may also apply to three-dimensional flight plan maps, and any other way to determine and display flight plans that involve traversing between various airspace regions to enable, initiate, maintain, or otherwise effect internet connectivity onboard the aircraft.

As shown in FIGS. 4A-4B, edges are provided between nodes, such as edge 430 representing a path between node 420 and node 434. While edges such as edge 430 are illustrated as straight lines, it will be appreciated that various embodiments may include edges having curved shapes, changes in altitude, or edges that require other aviation maneuvers.

In some embodiments, each edge includes a corresponding edge weight. The edge weight may represent various factors which may collectively be indicative of a flight quality along the path represented by the edge. The edge weight may be based on factors associated with the nodes connected by the edge, and/or factors associated with the edge itself. For example, nodes 434 and 450 may each be associated with high quality internet connectivity (e.g., high minimum download/upload data transfer rates), but the path along edge 448 between the two nodes may have low quality internet connectivity (e.g., low minimum download/upload data transfer rates), causing the edge weight for edge 448 to be modified so that the path along edge 448 is less preferred than nodes 434 and 450.

In some embodiments, the flight plan map 400 includes weather data such as a convective event 410. The convective event may represent a threat to the aircraft (e.g., heavy rain, turbulence, lightning). In some embodiments, the flight plan map 400 is generated by the aircraft navigation system 380 based on received data regarding the convective event 410 from the weather radar system 350. In some embodiments, the flight plan map 400 is generated by the flight plan module 396 based on received data regarding the convective event 410 from the weather radar module 392.

In some embodiments, the convective event 410 causes the flight plan map 400 to be modified. For example, as shown in FIG. 4A, the convective event 410 is shown as overlapping edges 424, 426, and 428, indicating that the aircraft would come into contact with and/or be affected by the convective event should the aircraft's route include edges 424, 426, or 428. In some embodiments, the flight plan optimization system 300 is configured to recalculate flight plan routes based on the presence of the convective event 410. For example, as shown in FIG. 4B, the flight plan optimization system 300 has recalculated flight plan routes based on the presence of the convective event 410 and has removed the edges 424, 426, and 428 from the flight plan map 400 so that all available flight routes circumnavigate the convective event 410. In some embodiments, the convective event 410 causes the weights of the edges 424, 426, and 428 to be changed so that a flight plan including the edges 424, 426, or 428 no longer becomes a potential flight plan between the current position 420 and the destination 422. For example, in some embodiments, the convective event 410 causes the weight associated with the edges 424, 426, and 428 to be decreased to zero (or increased to a very large number, e.g. infinity), and the flight plan optimization system 300 determines that any flight path including the edges 424, 426, and/or 428 is less optimal because such a flight path has a lesser (or greater) cumulative weight.

In some embodiments, the convective event 410 alters the flight plan map 400 based on the effect the convective event 410 has on internet connectivity. For example, in some cases, the convective event 410 may pose a minimal or non-existent physical threat to the aircraft. However, even a non-threatening convective event 410 may reduce or eliminate internet connectivity onboard the aircraft. For example, the convective event 410 may reduce or eliminate internet connectivity by interfering with (e.g., blocking) a line-of-sight between the aircraft and a communication source (e.g., satellite system 342, other aircraft 344, and/or terrestrial stations 346). Accordingly, if an edge is determined to represent a lower quality path (e.g., a path with insufficient internet connectivity), then the corresponding weight of that edge is modified so that any flight path including that edge will not be selected and/or will be determined to be less optimal. For example, in some embodiments, the flight plan optimization system 300 increases (or decreases) the weight of an edge when the edge represents a lower (or higher) quality path, and the flight plan optimization system 300 determines that any flight path including the edge is less (or more) optimal based on the increased (or decreased) weight of the edge.

In some embodiments, the flight plan optimization system 300 dynamically updates the flight plan map 400 over the course of a flight and/or in response to events such as the convection event 410. For example, as shown in FIG. 4B, in response to the convective event 410, the flight plan optimization system 300 may eliminate edges 424, 426, and 428 and nodes 444 and 446, and may add a new node 462 to the flight plan map 400. The flight plan optimization system 300 may accordingly add edge 460 connecting node 434 to node 462 and edge 464 connecting node 462 to the destination 422, indicating a potential new path for the aircraft.

In some embodiments, the flight plan optimization system 300 dynamically updates the flight plan map 400 upon the addition of any node within a certain distance of the aircraft. In some embodiments, the flight plan optimization system 300 dynamically updates the flight plan map 400 upon adding any nodes within a certain distance of the aircraft that are not affected by an aviation or weather event (e.g., convective event 410). In some embodiments, the flight plan optimization system 300 updates the flight plan map 400 in real time. In such embodiments, the flight plan optimization system 300 may add node 462 and corresponding edges 460, 464 based on the node 462 not being affected by the convective event 410 while still being within a certain distance of the aircraft.

In some embodiments, the flight plan optimization system 300 dynamically updates the flight plan map 400 by adding any node providing internet connectivity and having a certain internet connectivity characteristic. For example, the flight plan optimization system 300 may add node 462 to the flight plan map 400 because it is a node (and perhaps, the only node) available which is known to provide: an average internet data rate that is no less than a minimum average internet data rate required by the aircraft or a passenger onboard the aircraft; an average internet data rate that meets a critical threshold for a certain time along the flight path; or any other characteristic of internet connectivity.

Referring to FIG. 5, a schematic illustration of a display screen 500 displaying a flight map 501 is shown according to an exemplary embodiment of the inventive concepts disclosed herein. In some embodiments, the flight map 501 displayed on the display screen 500 provides information regarding current flight plans, as well as alternative flights plans, such as flights plans configured to optimize internet connectivity. The flight map 501 shows flight options between an origin 550 and a destination 552. The flight map 501 may also include internet connectivity features such as a satellite 560, a ground-based communication source 570 (e.g., a terrestrial tower 570), a second aircraft 580, and a convective weather event 590. In some embodiments, the display screen 500 includes switches (e.g., toggles, buttons, icons) for displaying information relevant to making flight plan decisions. For example, the display screen 500 includes a weather switch 522, which may be used to turn on/off an overlay of weather data, such as weather data received from the weather radar system 350. For example, the weather data may include a Doppler radar display illustrating the intensity of weather in various airspace regions. The display screen 500 may include a connectivity switch 524, which may be used to turn on/off an overlay of internet connectivity data, such as internet connectivity data associating internet connectivity characteristics with various airspace regions (e.g., similar to the weather overlay but indicating features of an internet characteristic). In some embodiments, a color gradient (or any other visual spectrum illustrating differences in internet connectivity data) may be used to illustrate internet connectivity characteristics. For example, the color gradient may include a first color at a first end of the visual spectrum associated with a minimal or insufficient data transfer rate, and a second color at the second end of the visual spectrum associated with a maximum possible data transfer rate (e.g., maximum possible data transfer rate that can be accessed by an internet-capable data receiver disposed on the aircraft). In some embodiments, the flight map 501 includes a feature for the current aircraft being flown (not shown).

As shown in FIG. 5, the flight plan 530 that is currently being followed by the aircraft, including waypoints 531, passes closes to the convective weather event 590. In some embodiments, an optimized flight plan will divert the aircraft away from the convective weather event 590, such as by changing flight paths to a flight plan 534 including waypoints 535, or a flight plan 536 including waypoints 537. For example, an optimized flight plan may determine that the convective weather event 590 either poses a threat to the aircraft, or that the convective weather event 590 acts as an external factor that reduces (e.g., reduces in nominal value, reduces the quality of) an internet connectivity characteristic. The optimized flight plan may thus be altered to the flight plan 534 or (flight plan 536) that has improved internet connectivity. In some embodiments, an alternate flight plan 534 (or flight path 536) is selected because the aircraft will travel through airspace regions that have improved line-of-sight and/or proximity to remote data sources such as the satellite 560, the terrestrial tower 570, and/or the second aircraft 580.

In some embodiments, the aircraft does not have line-of-sight to the satellite 560 or the terrestrial tower 570. The flight plan may be optimized by directing the flight path so that the aircraft has line-of-sight with the second aircraft 580, so that the aircraft is able to establish a data connection with the second aircraft 580 in order to receive internet connectivity.

In some embodiments, the flight plan optimization system 300 includes a system (e.g., a system similar or identical to the aircraft navigation system 380) for determining a connectivity quality map. The system may be ground-based, aircraft-based, or terrestrial-based. The system includes communication equipment such as antennas and receivers for communicating with remote data sources, such as for communicating internet connectivity data and transmitting the connectivity quality map. The system includes processing electronics for receiving internet connectivity data from the remote sources, creating the connectivity quality map, storing the connectivity quality map, updating the connectivity quality map, and optimizing the connectivity quality map.

In some embodiments, the flight plan optimization system 300 may include or be configured to connect to a service, such as a subscription-based service, for managing flight plans based on internet connectivity. The subscription service may use various systems described herein to create and manage internet connectivity quality maps. In some embodiments, internet coverage maps may be received from ground or satellite-based service providers, such as Inmarsat. In some embodiments, the flight plan optimization system 300 generates and maintains internet coverage maps based on received internet connectivity characteristics and/or previously known internet connectivity characteristics for a particular region. In some embodiments, the flight plan optimization system 300 may predict an internet connectivity characteristic for a particular region based on an internet coverage map. The subscription service may deliver aircraft-specific internet connectivity quality maps to aircraft, including recommendations for creating, modifying, and optimizing flight plans based on internet connectivity and other factors.

In some embodiments, the subscription-based service is also integrated with the data sources that provided internet connectivity to aircraft. The subscription-based service may be configured to distribute limited bandwidth available to multiple aircraft that are accessing the same data source. In some embodiments, the subscription-based service distributes limited bandwidth by evenly distributing the bandwidth amongst the aircraft connected to the data source. In some embodiments, the subscription-based service distributes the limited bandwidth in order to maximize the total bandwidth made available to all aircraft over a period of time. In some embodiments, multiple aircraft that are accessing the same data source may be able request the bandwidth (or portion thereof) that they require. For example, multiple aircraft may be able to establish a connection with the data source that has a data transfer rate that is commensurate with the price that the aircraft pay to access the data source.

Figure 6:
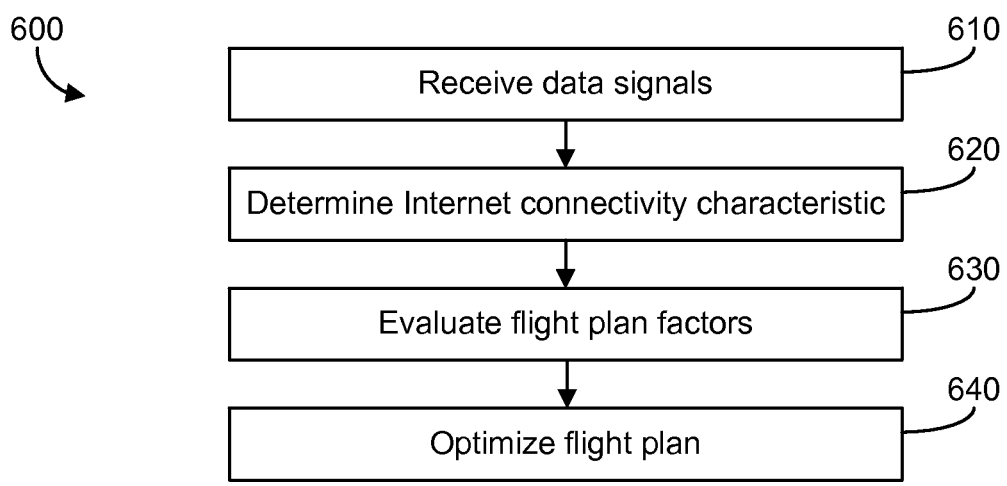
FIG. 6 is a flow diagram of a method of optimizing a flight plan based on internet connectivity, according to an exemplary embodiment.

Referring now to FIG. 6, a flow diagram of a method 600 for optimizing a flight plan for an aircraft based on internet connectivity is shown according to an exemplary embodiment of the inventive concepts disclosed herein. The method 600 may be implemented using any of the systems/apparatuses disclosed herein, such as on the aircraft 30, using the flight plan optimization system 300, the aircraft navigation system 380, and/or the flight plan 501 displayed by the display screen 500 as shown in FIG. 5.

At 610, data signals are received. For example, an aircraft communication system coupled to an aircraft navigation system may receive data signals from a remote source such as a terrestrial tower. The data signals may include internet data. The data signals may include an internet connectivity characteristic that describes the projected quality of the connection over which the data signals are received, and particularly the projected quality of the internet data being received via the data signals. A user may cause the data signals to be received by selecting a data source for the data signals and/or establishing a connection over which the data signals are received.

At 620, an internet connectivity characteristic is determined. The internet connectivity characteristic may include any of the internet connectivity characteristics disclosed herein, such as whether an internet connection is available, an average data transfer rate associated with the data signals, a price associated with the internet connection, and so on.

At 630, flight plan factors are evaluated. Flight plan factors may include any of the factors disclosed herein, such as fuel consumption, distance to destination, minimum or threshold internet data transfer rate requirements, weather factors, and so on. For example, different priorities (e.g., weighted values) may be assigned to different factors based on a flight analysis computer code, user input, or any combination thereof; the factor priorities may then be used to determine how significant each factor is for determining a flight plan.

At 640, the flight plan is optimized. For example, the flight plan may be optimized by determining an order of factors based on priorities that have been assigned to the factors, and then ensuring that the most significant factors bear the most weight in determining a flight plan for optimized internet connectivity. In some embodiments, the flight plan is optimized based on edge weights as discussed above in relation to FIGS. 4A-4B. For example, flight paths having edges associated with internet connections having high data transfer rates may be assigned high edge weights, and the flight path with the highest total edge weight sum may be determined to be the optimal flight plan.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on machine-readable media capable of accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a special purpose computer or other special purpose machine with a processor. By way of example, such machine-readable storage media may include RAM, ROM, EPROM, EEPROM, CD ROM or other optical disk storage, magnetic disk storage or other magnetic storage devices, or any other medium which may be used to carry or store desired program code in the form of machine-executable instructions or data structures and which may be accessed by a special purpose computer or other special purpose machine with a processor. Combinations of the above are also included within the scope of machine-readable storage media. Machine-executable instructions include, for example, instructions and data which cause a special purpose computer or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, and so on, that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments may use computer networks, intranets, and the internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A system for determining a flight plan, comprising:
   at least one processor coupled with a non-transitory processor-readable medium storing processor-executable code for causing the at least one processor to:
   receive internet connectivity data for a plurality of waypoints, each waypoint associated with an airspace region, the waypoints defining potential flight paths for an aircraft;
   determine, for each waypoint, an internet connectivity characteristic based on the internet connectivity data, the internet connectivity characteristic indicating a quality of a potential internet connection for the aircraft at the waypoint;
   receive supplemental internet connectivity data from a ground station, wherein the supplemental internet connectivity data received from the ground station is based on at least one of a modified flight plan of another aircraft and a bandwidth currently being used by another aircraft;
   generate a flight plan for the aircraft, based on the supplemental internet connectivity data, the flight plan comprising a flight path comprising particular waypoints selected from the plurality of waypoints, the selection of a particular waypoint based on the quality of the potential internet connection for the aircraft at the particular waypoint;
   provide a display of the generated flight plan to a user via a display screen; and
   transmit, using an antenna of an onboard communications system, the flight plan to the ground station.

2. The system of claim 1, wherein the internet connectivity characteristic is based on at least one of whether an internet connection is available, a maximum data transfer rate available, and an average minimum data transfer rate available.

3. The system of claim 1, further comprising a communication system coupled with the at least one processor, the communication system configured to receive the internet connectivity data from an external communications system, wherein the internet connectivity data is indicative of a plurality of internet connectivity characteristics associated with a plurality of internet connections available to the aircraft in each airspace region.

4. The system of claim 1, wherein the generated flight plan is a first generated flight plan between an origin and a destination, and wherein the non-transitory processor-readable medium further stores processor-executable code for causing the at least one processor to:
   generate a second flight plan between the origin and the destination;
   compare the first flight plan and the second flight plan based on the quality of the potential internet connection for the aircraft for each flight plan; and
   display a representation of the first flight plan and the second flight plan and the comparison of the first flight plan and the second flight plan to the user via the display screen, and receive a user input indicative of a selected flight plan.

5. The system of claim 1, wherein the non-transitory processor-readable medium further stores processor-executable code for causing the at least one processor to generate the flight plan based on weather data, and wherein the weather data is indicative of a weather event occurring within at least one airspace region.

6. The system of claim 1, wherein the non-transitory processor-readable medium further stores processor-executable code for causing the at least one processor to generate the flight plan further based on a user input, the user input indicative of at least one of a desired minimum data transfer rate, a period of time when the aircraft is airborne, and a desired internet upload or download rate.

7. A method of determining a flight plan, comprising:
   receiving, by at least one processor executing processor-readable code stored in a non-transitory processor-readable medium, a data signal indicative of internet connectivity data for a plurality of waypoints, each waypoint associated with an airspace region, the waypoints defining potential flight paths for an aircraft;

determining, by the at least one processor, for each waypoint, an internet connectivity characteristic based on the internet connectivity data, the internet connectivity characteristic indicating a quality of a potential internet connection for the aircraft at the waypoint;

receiving supplemental internet connectivity data from a ground station, wherein the supplemental internet connectivity data received from the ground station is based on at least one of a modified flight plan of another aircraft and a bandwidth currently being used by another aircraft;

generating, by the at least one processor, a flight plan for the aircraft, based on the supplemental internet connectivity data, the flight plan comprising a flight path comprising particular waypoints selected from the plurality of waypoints, the selection of a particular waypoint based on the quality of the potential internet connection for the aircraft at the particular waypoint;

providing, by the at least one processor, a display of the generated flight plan to a user via a display screen; and transmitting, using an antenna of an onboard communications system, the flight plan to the ground station.

8. The method of claim 7, wherein the internet connectivity characteristic is based on at least one of whether an internet connection is available, a maximum data transfer rate available, and an average minimum data transfer rate available.

9. The method of claim 7, wherein the data signal includes a plurality of internet connectivity characteristics associated with a plurality of internet connections available to the aircraft in the airspace regions.

10. The method of claim 7, wherein the generated flight plan is a first generated flight plan between an origin and a destination, and further comprising generating, by the at least one processor, a second flight plan between the origin and the destination;

comparing the first flight plan and the second flight plan.

11. The method of claim 10, further comprising displaying a representation of the first flight plan and the second flight plan and the comparison of the first flight plan and the second flight plan to the user, and receiving a user input indicative of a selected flight plan.

12. The method of claim 7, wherein generating the flight plan further includes generating the flight plan based on weather data, wherein the weather data is indicative of a weather event occurring within at least one airspace region.

13. The method of claim 7, wherein optimizing the flight plan further includes optimizing the flight plan based on a user input, wherein the user input is indicative of at least one of a desired minimum data transfer rate, a period of time when the aircraft is airborne, and a desired internet upload or download rate.

14. A system for determining a flight plan, comprising:
at least one processor coupled with a non-transitory processor-readable medium storing processor-executable code for causing the at least one processor to:
receive flight plan data indicative of a first flight plan for an aircraft;

receive internet connectivity data for a plurality of waypoints, each waypoint associated with an airspace region, the waypoints defining potential flight paths for the aircraft;

determine, for each waypoint, an internet connectivity characteristic based on the internet connectivity data, the internet connectivity characteristic indicating a quality of a potential internet connection for the aircraft at the waypoint;

generate a second flight plan and a third flight plan for the aircraft based on the quality of the potential internet connection for the aircraft at particular waypoints; and provide display data indicative of the second flight plan, the third flight plan, and the internet connectivity characteristics of the first flight plan, the second flight plan, and the third flight plan to a display system;

wherein the first flight plan and the second flight plan are associated with a first origin and a first destination, wherein the third flight plan is associated with the first origin and a second destination, and wherein the non-transitory processor-readable medium further stores processor-executable code for causing the at least one processor to compare the first flight plan, the second flight plan, and the third flight plan based on the internet connectivity characteristic and the first destination and the second destination.

15. The system of claim 14, wherein the internet connectivity characteristic is based on at least one of whether an internet connection is available, a maximum data transfer rate available, and an average minimum data transfer rate available.

16. The system of claim 14, further comprising a communication system configured to receive the internet connectivity data from an external communications system, wherein the internet connectivity data is indicative of a plurality of internet connectivity characteristics associated with a plurality of internet connections available to the aircraft in each airspace region.

17. The system of claim 14, wherein the non-transitory processor-readable medium further stores processor-executable code for causing the at least one processor to display a representation of the comparison of the first flight plan, the second flight plan, and the third flight plan to a user via the display system, and receive a user input indicative of a selected flight plan.

18. The system of claim 14, wherein the non-transitory processor-readable medium further stores processor-executable code for causing the at least one processor to generate the second flight plan and the third flight plan based on weather data, and wherein the weather data is indicative of a weather event occurring within at least one airspace region.

* * * * *